United States Patent
Sudo

(10) Patent No.: US 9,232,133 B2
(45) Date of Patent: Jan. 5, 2016

(54) IMAGE CAPTURING APPARATUS FOR PRIORITIZING SHOOTING PARAMETER SETTINGS AND CONTROL METHOD THEREOF

(71) Applicant: CANON KABUSHIKI KAISHA, Tokyo (JP)

(72) Inventor: Koji Sudo, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 14/070,649

(22) Filed: Nov. 4, 2013

(65) Prior Publication Data

US 2014/0125833 A1     May 8, 2014

(30) Foreign Application Priority Data

Nov. 6, 2012 (JP) ................. 2012-244807
Oct. 4, 2013 (JP) ................. 2013-209623

(51) Int. Cl.
    *H04N 5/228*     (2006.01)
    *H04N 5/232*     (2006.01)
    *H04N 5/225*     (2006.01)

(52) U.S. Cl.
    CPC ......... *H04N 5/23216* (2013.01); *H04N 5/2258* (2013.01); *H04N 5/23293* (2013.01)

(58) Field of Classification Search
    CPC .................................. H04N 5/23216
    See application file for complete search history.

(56) References Cited

U.S. PATENT DOCUMENTS 8,988,491 B2 *   3/2015    Yamashita et al. ......... 348/14.13
2012/0056975 A1 *  3/2012    Yamashita et al. ......... 348/14.13

FOREIGN PATENT DOCUMENTS

JP      2010-171849 A     8/2010

* cited by examiner

*Primary Examiner* — Gary C Vieaux
(74) *Attorney, Agent, or Firm* — Carter, DeLuca, Farrell & Schmidt, LLP

(57) ABSTRACT

An image capturing apparatus comprises a first image capturing unit configured to shoot an object side, a second image capturing unit configured to shoot a photographer side, a detection unit configured to detect an object from image data shot by the second image capturing unit, a determination unit configured to determine whether the object detected by the detection unit is a predetermined object, and a control unit configured to, when the determination unit determines that the detected object is the predetermined object, control to prioritize setting of shooting parameters of the second image capturing unit over that of the first image capturing unit.

9 Claims, 8 Drawing Sheets

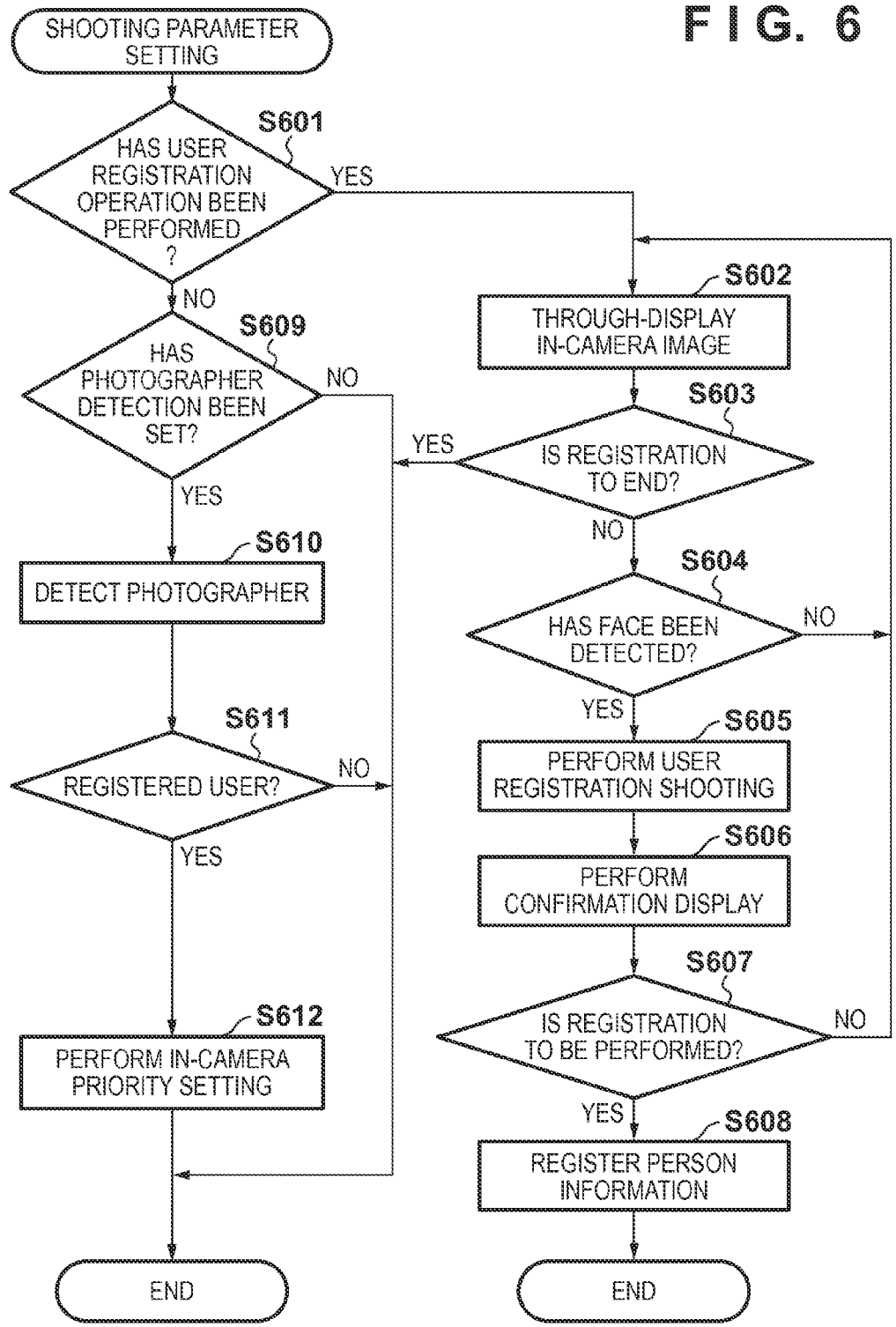

IMAGE CAPTURING APPARATUS FOR PRIORITIZING SHOOTING PARAMETER SETTINGS AND CONTROL METHOD THEREOF

BACKGROUND OF THE INVENTION

1. Field of the Invention

The present invention relates to an image capturing apparatus including a plurality of image capturing units.

2. Description of the Related Art

Recent mobile phones and smartphones include a camera (in-camera) for shooting a photographer himself/herself or an object on the photographer side in addition to a normal camera (out-camera) for shooting an object seen from the photographer. An electronic device incorporating such out-camera and in-camera performs shooting by simultaneously releasing the shutters of the out-camera and in-camera upon pressing a shutter button. For example, Japanese Patent Laid-Open No. 2010-171849 describes a technique in which an in-camera shoots the face of a person who watches images in front of a display monitor, and images including the person who is present are prioritized and reproduced.

The conventional technique described in Japanese Patent Laid-Open No. 2010-171849, however, does not consider a case in which a person who views images is a photographer himself/herself. On the other hand, together with an increase in the size of recording medium, recent digital cameras can efficiently record or reproduce and watch a large number of desired images. Especially when a person who views images is a photographer himself/herself, it is desirable to be able to prioritize images that include the photographer and record or reproduce them.

SUMMARY OF THE INVENTION

The present invention has been made in consideration of the aforementioned problems, and realizes a technique of, when a person who views images is a photographer himself/herself, prioritizing images that include the photographer and recording or reproducing them.

In order to solve the aforementioned problems, the present invention provides an image capturing apparatus comprising: a first image capturing unit configured to shoot an object side; a second image capturing unit configured to shoot a photographer side; a detection unit configured to detect an object from image data shot by the second image capturing unit; a determination unit configured to determine whether the object detected by the detection unit is a predetermined object; and a control unit configured to, when the determination unit determines that the detected object is the predetermined object, control to prioritize setting of shooting parameters of the second image capturing unit over that of the first image capturing unit.

In order to solve the aforementioned problems, the present invention provides an image capturing apparatus comprising: a first image capturing unit configured to shoot an object side; a second image capturing unit configured to shoot a photographer side; a detection unit configured to detect objects from first image data shot by the first image capturing unit and second image data shot by the second image capturing unit; a comparison unit configured to compare the object detected from the first image data with the object detected from the second image data; and a control unit configured to control, when the object detected from the first image data and the object detected from the second image data are identical as a result of the comparison by the comparison unit, to prioritize the first image data over the second image data and display the first image data on a display unit, and when the objects are not identical, to prioritize the second image data over the first image data and display the second image data on the display unit.

In order to solve the aforementioned problems, the present invention provides a control method of an image capturing apparatus having a first image capturing unit configured to shoot an object side and a second image capturing unit configured to shoot a photographer side, the method comprising: a detection step of detecting an object from image data shot by the second image capturing unit; a determination step of determining whether the detected object is a predetermined object; and a control step of, when it is determined that the detected object is the predetermined object, controlling to prioritize setting of shooting parameters of the second image capturing unit over that of the first image capturing unit.

In order to solve the aforementioned problems, the present invention provides a control method of an image capturing apparatus having a first image capturing unit configured to shoot an object side and a second image capturing unit configured to shoot a photographer side, the method comprising: a detection step of detecting objects from first image data shot by the first image capturing unit and second image data shot by the second image capturing unit; a comparison step of comparing the object detected from the first image data with the object detected from the second image data; and a control unit of controlling, when the object detected from the first image data and the object detected from the second image data are identical as a result of the comparison, to prioritize the first image data over the second image data and display the first image data on a display unit, and when the objects are not identical, to prioritize the second image data over the first image data and display the second image data on the display unit.

According to the present invention, when a person who views images is a photographer himself/herself, it is possible to prioritize images that include the photographer, and record or reproduce them.

Further features of the present invention will become apparent from the following description of exemplary embodiments (with reference to the attached drawings).

BRIEF DESCRIPTION OF THE DRAWINGS

FIG. 6 is a flowchart illustrating shooting parameter setting processing in step S406 of FIG. 4;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Embodiments upon application of the present invention to an image capturing apparatus such as a digital camera for shooting a still image and/or moving image will be described in detail hereinafter with reference to the drawings.

<Apparatus Configuration>

The configuration and functions of an image capturing apparatus according to this embodiment of the present invention will be described below with reference to FIG. 1.

Figure 1:
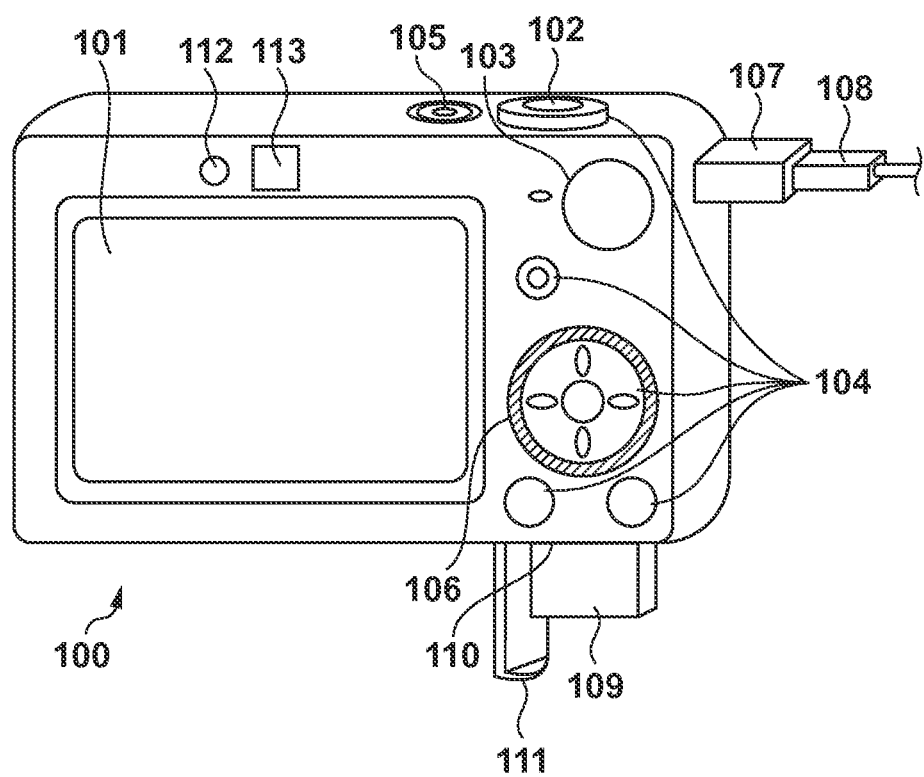
FIG. 1 a view showing the outer appearance of an image capturing apparatus according to an embodiment of the present invention.

In FIG. 1, a display unit 101 is a display device such as an LCD panel which displays images and various information. A shooting button 102 is an operation unit for a shooting instruction. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110. An in-camera 112 is a camera module for shooting a photographer himself/herself or an object on the photographer side. A viewfinder 113 is provided for the photographer to shoot an object while seeing through the viewfinder, and includes an eye detection unit for detecting whether the photographer's eye is in contact with the viewfinder 113.

Figure 2:
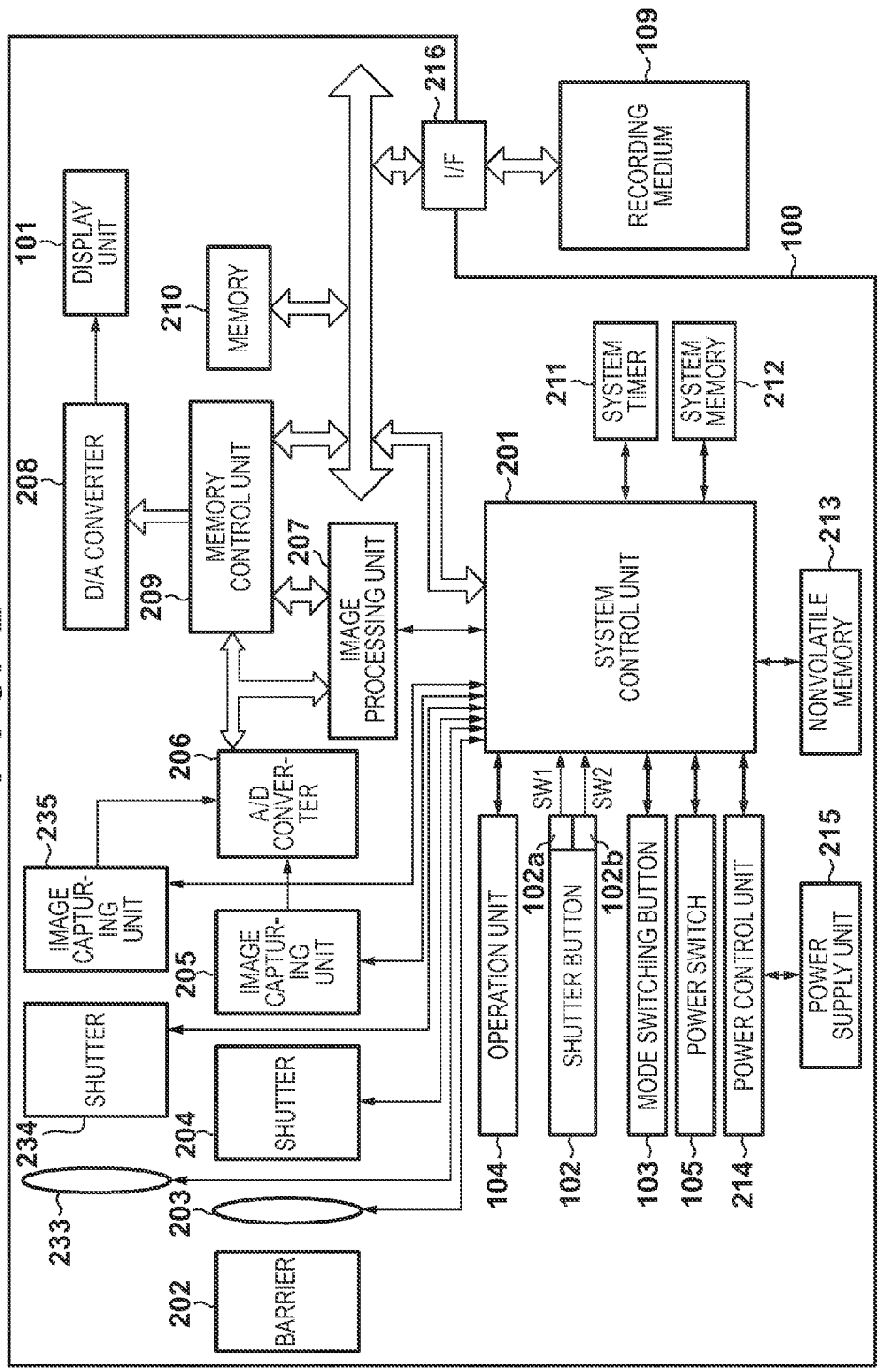
FIG. 2 is a block diagram showing the configuration of the image capturing apparatus according to the embodiment.

FIG. 2 is a block diagram exemplifying the configuration of the digital camera 100 according to this embodiment.

Referring to FIG. 2, the digital camera 100 according to this embodiment includes an out-camera module (to be referred to as an out-camera hereinafter) for shooting an object seen from the photographer, and an in-camera module (to be referred to as an in-camera hereinafter) for shooting the photographer himself/herself or an object on the photographer side. The out-camera includes a first imaging optical system formed by a photographing lens 203, a shutter 204, and an image capturing unit 205. The in-camera includes a second imaging optical system formed by a photographing lens 233, a shutter 234, and an image capturing unit 235.

Each of photographing lenses 203, 233 includes a zoom lens and a focusing lens. Each of shutters 204, 234 has a diaphragm function. Each of image capturing units 205, 235 is an image sensor, which is constituted by a CCD or CMOS or the like, for converting the optical image of a subject to an electric signal.

An A/D converter 206 converts analog signals, each of which is output from the image capturing units 205, 235, to a digital signal. A barrier 202 covers the image capturing system which includes the photographing lens 203 of the part of the out-camera of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

Note that the A/D converter 206 and image processing unit 207 can be provided in each of the image capturing units 205 and 235.

The data from the A/D converter 206 is directly written into a memory 210 via both the image processing unit 207 and the memory control unit 209 or via the memory control unit 207. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and applies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. The digital signal once converted by the A/D converter 206 and stored in the memory 210 are converted into analog signals by the D/A converter 208, and the analog signals are successively transmitted to the display unit 101 so as to be displayed thereon, making it possible to realize an electronic view finder (EVF) functionality and to perform through image display (live view display).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, a simultaneous recording mode in which the out-camera and in-camera can simultaneously perform shooting, and the like. Using the mode switching button 103, the mode is directly switched to any of the plurality of modes included in the still image recording mode. Alternatively, it is also possible to switch, using the mode switching button 103, to the still image recording mode and then to switch, using another operation member, to any of the plurality of modes included in the still image recording mode. Similarly, also the moving image recording mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from each of the image capturing units 205, 235 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor. The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101. The system control unit 201 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the system control unit 201 through an internal bus and, based upon the information thus communicated, the system control unit 201 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. It should be noted that the touch panel may employ a method that relies upon any of the following: resistive film, electrostatic capacitance, surface acoustic waves, infrared radiation, electromagnetic induction, image recognition and optical sensing.

<Basic Operation>

The basic operation of the digital camera 100 according to this embodiment from the start to the end will be described with reference to FIG. 3. Note that processing shown in FIG. 3 is implemented when a program recorded in the nonvolatile memory 213 is read out into the system memory 212, and executed by the system control unit 201.

The in-camera basically performs the same operation as that of the out-camera, as will be described below. Processing unique to the in-camera will be specifically supplemented.

Figure 3:
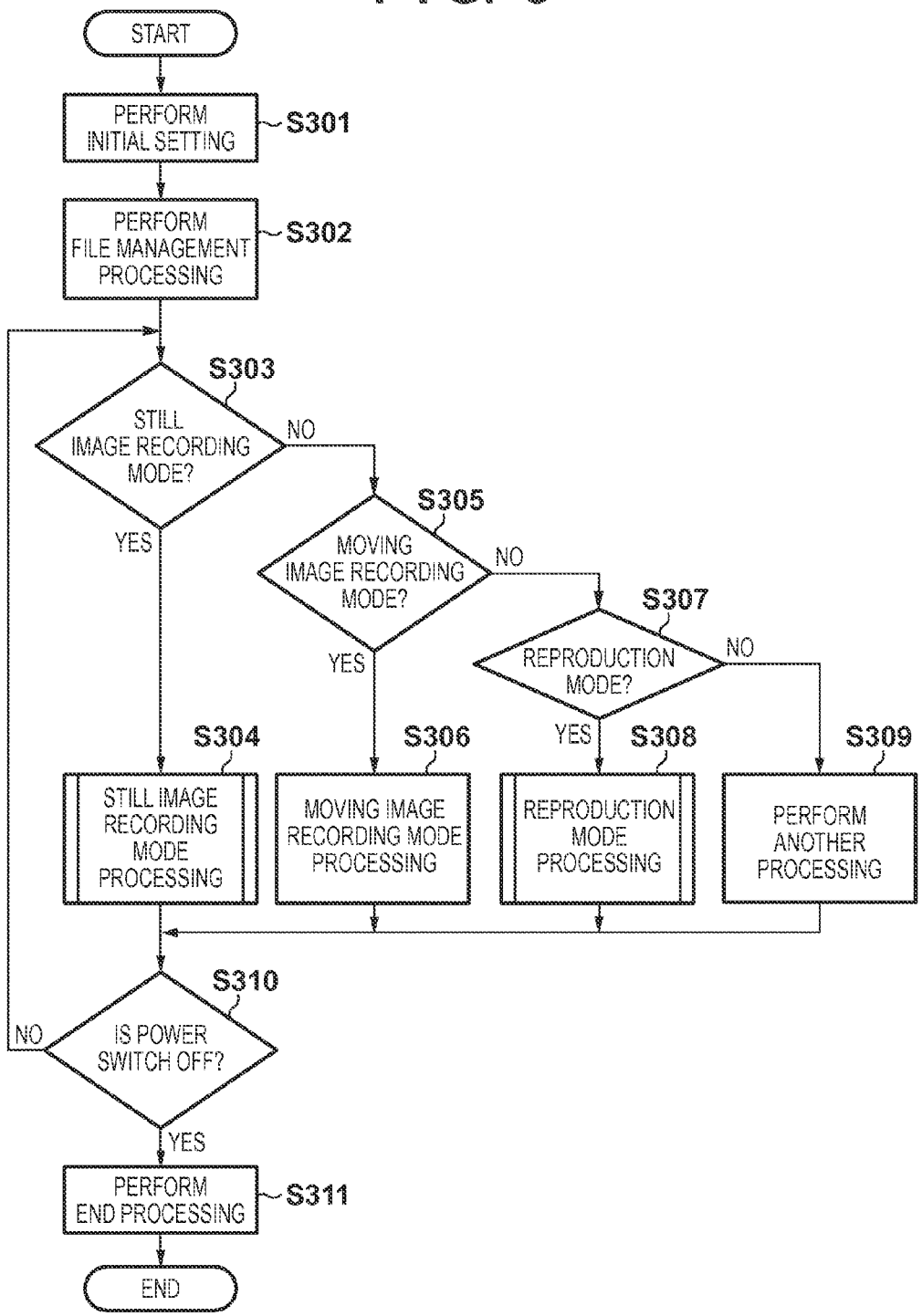
FIG. 3 is a flowchart illustrating the basic operation of the image capturing apparatus according to the embodiment.

Upon turning on the power switch 105 of the digital camera 100, the processing shown in FIG. 3 starts.

In step S301, the system control unit 201 initializes a flag, a control variable, and the like. In step S302, the system control unit 201 starts management processing for files recorded in the recording medium 109.

In steps S303, S305, and S307, the system control unit 201 determines the set position of the mode switching button 103. If it is determined in step S303 that the mode switching button 103 has been set in the still image recording mode, the process advances to step S304 to execute still image recording mode processing to be described later with reference to FIG. 4. If it is determined in step S305 that the mode switching button 103 has been set in the moving image recording mode, the process advances to step S306 to execute moving image recording mode processing. Furthermore, if it is determined in step S307 that the mode switching button 103 has been set in the reproduction mode, the process advances to step S308 to execute reproduction mode processing.

If it is determined in steps S303, S305, and S307 that the mode switching button 103 has not been set in any of the still image recording mode, moving image recording mode, and reproduction mode, the process advances to step S309 and the system control unit 201 executes another mode processing. The other mode processing includes, for example, transmission mode processing of transmitting a file stored in the recording medium 109, and reception mode processing of receiving a file from an external device and storing it in the recording medium 109.

After executing the mode processing in step S304, S306, 3308, or S309, the process advances to step S310 and the system control unit 201 determines the set position of the power switch 105. If the power switch 105 is ON, the process returns to step S303. Alternatively, if the power switch 105 is OFF, the process advances to step S311.

In step S311, the system control unit 201 performs end processing. The end processing includes, for example, processing of changing display of the display unit 101 to an end state and closing the barrier 202 to protect the image capturing unit 205, and processing of recording parameters including a flag and control variable, set values, and a set mode in the nonvolatile memory 213 and interrupting power supply to parts which do not require power supply.

Upon completion of the end processing in step S311, the apparatus transits to a power-off state.

<Still Image Recording Mode>

Figure 4:
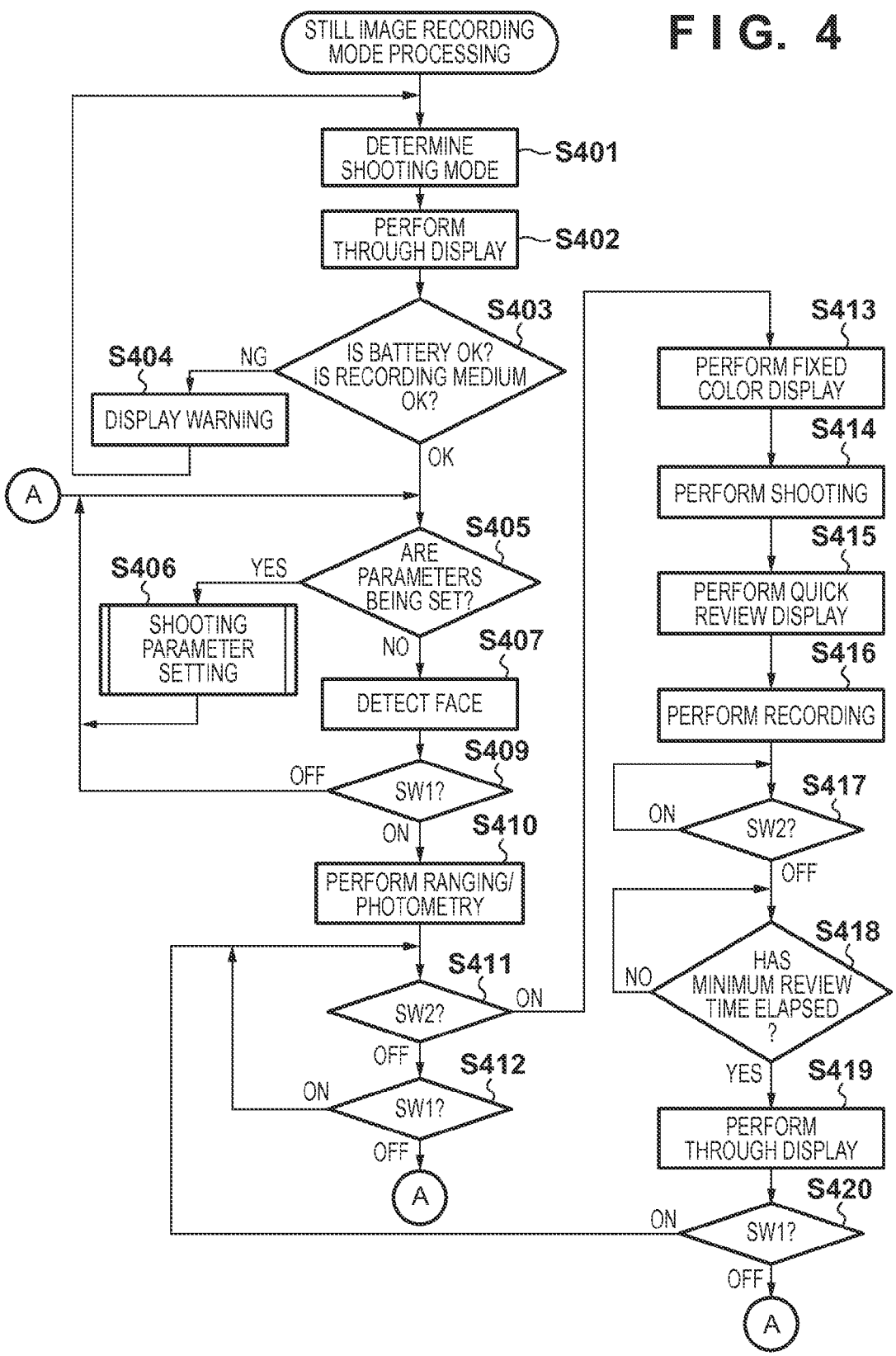
FIG. 4 is a flowchart illustrating the operation of the image capturing apparatus in a still image recording mode according to the embodiment.

The still image recording mode processing in step S304 of FIG. 3 will be described with reference to FIG. 4. Note that processing shown in FIG. 4 is terminated by interrupt processing or the like when the mode switching button 103 instructs to switch to another operation mode or when the power switch 105 is turned off.

In step S401, the system control unit 201 determines the shooting mode. The shooting mode determination is done by obtaining the shooting mode at the end of the previous still image recording mode from the nonvolatile memory 213, and storing it in the system memory 212. This shooting mode is used to shoot a still image. The digital camera 100 according to this embodiment has the following shooting modes.

Automatic shooting mode: various parameters of the camera are automatically decided by a program embedded in the digital camera 100 based on a measured exposure value.

Manual mode: the user can freely change various parameters of the camera.

Scene mode: the combination of the shutter speed, the f-number, the flash light emission amount, the sensitivity setting, and the like suitable for a shooting scene is automatically set.

Note that the scene mode includes the following modes.

Portrait mode: a mode specialized to shoot a person while blurring the background to enhance the person.

Night view mode: a mode specialized to a night scene, in which a person is irradiated with flash light, and the background is recorded at a low shutter speed.

Landscape mode: a mode specialized to a vast landscape scene.

Night & snap mode: a mode suitable for clearly shooting a night view and a person without using a tripod.

Kids & pets mode: a mode that allows shooting of a child or pet incapable of staying still without missing the best moment for shooting.

Spring & autumn color mode: a mode suitable for shooting trees and leaves in fresh green of spring or the like.

Party mode: a mode to shoot an object in faithful tint under a fluorescent lamp or incandescent lamp while suppressing a camera shake.

Snow mode: a mode to shoot a person with a snowy background without making the person dark and leaving tinges of blue.

Beach mode: a mode that allows shooting of a person or the like on the sea or a beach with strong sunlight reflection without making the person dark.

Fireworks mode: a mode to clearly shoot skyrockets under optimum exposure.

Aquarium mode: a mode to set a sensitivity, white balance, and tint suitable for shooting fish and the like in an indoor aquarium.

Underwater mode: a mode to set a white balance optimum in water and perform shooting while suppressing tinges of blue.

Monochrome mode: a mode to select a tone such as black-and-white, sepia, blue, violet, or green and perform shooting.

Full color mode: a mode to shoot an image in vivid colors and high saturation.

Live view mode: a mode that allows selection of the brightness, tone, and saturation by plain words and composition of an image.

Photographer recording mode: a mode to control exposure, WB, and the like for obtaining an optimum image without flash light because the in-camera cannot emit flash light.

In step S402, the system control unit 201 performs through display (image display control) for image data captured by the image capturing unit 205. In the through display, an image that is being captured by the image capturing unit 205 is displayed on the display unit 101 as a moving image almost in real time without recording it in the recording medium 109. The photographer can confirm the angle of view or adjust the timing of shooting while viewing the through display.

In step S403, the system control unit 201 determines, using the power supply control unit 214, whether the remaining battery level of the power supply unit 215, or the presence/absence or the remaining capacity of the recording medium 109 poses a problem in the operation of the digital camera 100. If a problem is present, the process advances to step S404, and the system control unit 201 displays a predetermined warning on the display unit 101 by an image or sound, and returns the process to step S401. If no problem is present, the process advances to step S405.

In step S405, the system control unit 201 expands shooting settings stored in the nonvolatile memory 213 according to user settings on the system memory 212, and determines whether the shooting parameters are being set. If the shooting parameters are not being set, the process advances to step S407. If the shooting parameters are being set, the process advances to step S406 to execute processing according to the shooting parameter setting. A parameter setting operation for performing shooting by prioritizing the image quality of the in-camera in step S406 will be described later with reference to FIG. 6.

In step S407, the system control unit 201 detects the face of a person from the through-displayed image (face detection processing). Upon detecting the face of a person in the face detection processing, the system control unit 201 stores the position coordinates and size (width and height) of the detected face, the number of detected faces, the reliability coefficient, and the like in the system memory 212 as face information. If no face is detected in the face detection processing, the system control unit 201 sets 0 in the areas of the position coordinates, the size (width and height), the number of detected faces, the reliability coefficient, and the like in the system memory 212.

In step S409, the system control unit 201 determines whether the first shutter switch signal SW1 is ON (shooting preparation instruction acceptance). If the first shutter switch signal SW1 is OFF, the process returns to step S405; otherwise, the process advances to step S410.

In step S410, a shooting preparation operation is performed. The system control unit 201 performs ranging processing and sets the object in the focus of the photographing lens 203 (AF processing), and also performs photometry processing and decides the f-number and the shutter speed (AE processing). Note that the flash setting is also done in the photometry processing as needed. If a face has been detected in step S407, face AF can be performed to do ranging within the range of the detected face. Similarly, the in-camera performs shooting preparation operation processing.

In steps S411 and S412, the system control unit 201 determines the ON/OFF states of the first shutter switch signal SW1 and the second shutter switch signal SW2. When the second shutter switch signal SW2 is turned on in the ON state of the first shutter switch signal SW1, the process advances to step S413. After that, when the first shutter switch signal SW1 is turned off (when the second shutter switch signal SW2 remains OFF, and the first shutter switch signal SW1 is also turned off), the process returns to step S406. While the first shutter switch signal SW1 is ON and the second shutter switch signal SW2 is OFF, the processes in steps S411 and S412 are repeated.

In step S413, the system control unit 201 sets the display state of the display unit 101 from a through display state to a fixed color display state (for example, display all in black).

In step S414, the system control unit 201 executes shooting processing including exposure processing and development processing. In the exposure processing, the image data obtained via the image capturing unit 205 and the A/D converter 206 is written in the memory 210 via the image processing unit 207 and the memory control unit 209 or directly from the A/D converter 206 via the memory control unit 209. In the development processing, the system control unit 201 reads out the image data written in the memory 210 and performs various processes using the memory control unit 209, and as needed, the image processing unit 207.

In step S415, the system control unit 201 performs quick review display of the image data obtained by the shooting processing. The quick review display is processing of displaying image data on the display unit 101 only during a predetermined time (review time) after shooting the object and before recording a shot image in the recording medium to confirm the shot image.

In step S416, the system control unit 201 writes first image data (to be also referred to as an out-camera image hereinafter) shot by the out-camera in the recording medium 109 as a file. At this time, the system control unit 201 also writes second image data (to be also referred to as an in-camera image hereinafter) shot by the in-camera in the recording medium 109. Metadata for associating the image data shot by the out-camera and in-camera is embedded in each of the image data. When, for example, displaying the image data in the reproduction mode, it is possible to simultaneously display the out-camera image data and the in-camera image data on the display unit 101. In this embodiment, this operation is realized by assigning serial numbers to the shot images. Note that this operation can also be implemented by additionally holding association information.

In step S417, the system control unit 201 determines the ON/OFF state of the second shutter switch signal SW2, and stands by for the second shutter switch signal SW2 to be turned off. During the time until the second shutter switch signal SW2 is turned off, the system control unit 201 continues the quick review display. That is, upon completion of the recording processing in step S416, the system control unit 201 continues the quick review display on the display unit 101 until the second shutter switch signal SW2 is turned off. This arrangement enables the user to carefully check the shot image data using the quick review display by continuing the full pressing state of the shutter button 102. If the second shutter switch signal SW2 is turned off in step S417, that is, the user cancels the full pressing state by, for example, moving the hand off the shutter button 102, the process advances to step S418.

In step S418, the system control unit 201 determines whether the predetermined review time of the quick review display has elapsed. If the review time has not elapsed, the process stands by for the elapse of the review time. If the review time has elapsed, the process advances to step S419.

In step S419, the system control unit 201 returns the display state of the display unit 101 from the quick review display state to the through display state. With this processing, after confirming the shot image data through the quick review display, the display state of the display unit 101 automatically switches to the through display state to sequentially display image data captured by the image capturing unit 205 for next shooting.

In step S420, the system control unit 201 determines the ON/OFF state of the first shutter switch signal SW1. If the first shutter switch signal SW1 is ON, the process returns to step S411. If the first shutter switch signal SW1 is OFF, the process returns to step S405. That is, if the halfway pressing state of the shutter button 102 continues (the first shutter switch signal SW1 is ON), the system control unit 201 prepares for the next shooting (step S411). On the other hand, if the shutter button 102 has been released (the first shutter switch signal SW1 is OFF), the system control unit 201 ends the series of shooting operations and returns to a shooting standby state (step S406).

<Reproduction Mode>

Figure 5:
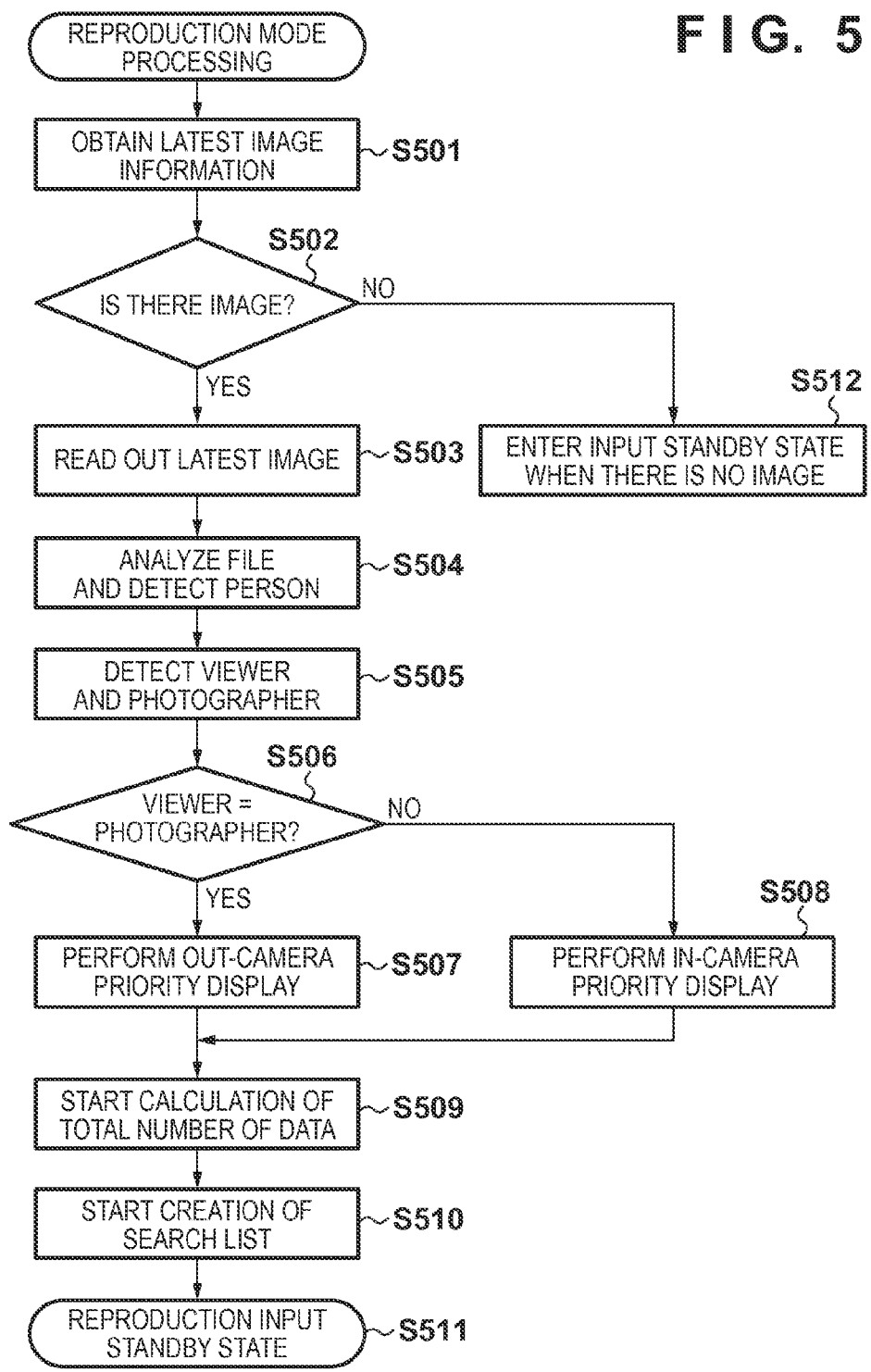
FIG. 5 is a flowchart illustrating the operation of the image capturing apparatus in a reproduction mode according to the embodiment.

The reproduction mode processing in step S308 of FIG. 3 will be described with reference to FIG. 5.

In step S501, the system control unit 201 obtains latest image information from the recording medium 109. By obtaining the latest image information before calculating the total number of images or creating a search list, it is possible to quickly display a processing result upon transiting to the reproduction mode.

In step S502, the system control unit 201 checks whether the latest image information has been successfully obtained in step S501. If no latest image information could be obtained, the process advances to step S512.

In step S512, the system control unit 201 enters an input standby state when there is no image. Note that a case in which no latest image information could be obtained indicates a state in which there is no image, a state in which no image information could be obtained due to a media defect, or the like. If the latest image information could be obtained, it is determined that at least one image exists and the process advances to step S503.

In step S503, the system control unit 201 reads out latest image data from the recording medium 109 based on the latest image information obtained in step S501. The system control unit 201 also reads out in-camera image data paired with the readout latest image from the recording medium 109.

In step S504, the system control unit 201 performs file analysis processing to obtain shooting information, attribute information, and the like of an image in the latest image data read out from the recording medium 109 and to obtain person detection data from the in-camera image data.

In step S505, the system control unit 201 performs shooting using the in-camera, and stores in-camera image data in the memory 210.

In step S506, the system control unit 201 compares person information detected from the in-camera image data read out from the recording medium 109 in step S503 with person information of a viewer shot by the in-camera in step S505.

Figure 7A:
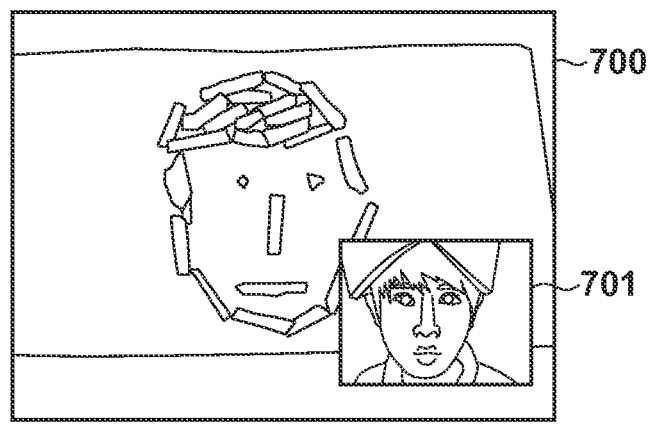
FIGS. 7A to 7C are views each exemplifying the reproduction screen of the image capturing apparatus in the reproduction mode according to the embodiment.
Figure 7B:
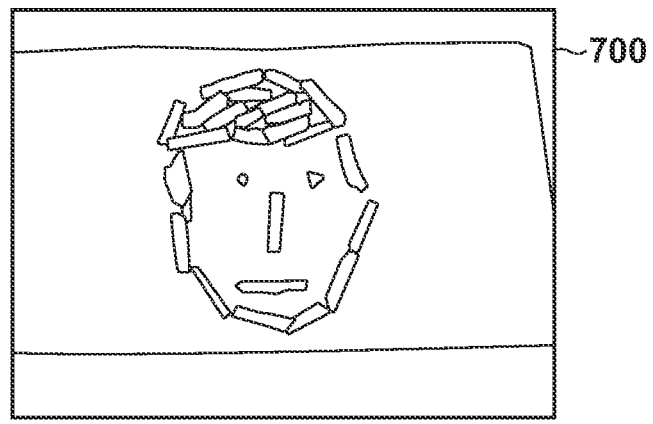

If it is determined in step S506 that the viewer and the photographer are identical, the process advances to step S507 and the system control unit 201 displays latest image data 700 read out from the recording medium 109 in a size larger than that of in-camera image data 701 (FIG. 7A). Note that at this time, it is also possible to confirm only the image data 700 recorded by the photographer by displaying only the latest image data (FIG. 7B).

Figure 7C:

If it is determined in step S506 that the viewer and the photographer are not identical, the process advances to step S508 and the system control unit 201 displays in-camera image data 703 in a size larger than that of latest image data 704 read out from the recording medium 109 (FIG. 7C).

As described above, the viewer can enjoy the atmosphere of the shooting site by confirming both the photographer and a person who is being shot. The viewer can also enjoy a shot image while confirming the intention and feeling of the photographer.

In step S507 or S508, the shooting information, attribute information, and the like obtained in step S504 are also displayed. If it is found from the file analysis result in step S504 that the file is invalid data, for example, part of a file is corrupt, error display is also performed.

In step S509, the system control unit 201 starts processing of obtaining the total number of image files recorded in the recording medium 109. This processing is executed in the background, and the process can advance to the next step before completion of the processing. This makes it possible to view an image without standing by for completion of calculation of the total number of image data even if a large number of image data are stored in the recording medium 109 and thus it takes time to calculate the total number of image data. That processing is effective especially when, upon transiting from the recording mode to the reproduction mode, image data is newly recorded or deleted in the recording mode to cause a change in total number of image data. If image data is not newly recorded or is not deleted in the recording mode, the already calculated total number of image data is used, and thus the processing of calculating the total number of image data need not be performed.

In step S510, the system control unit 201 starts to create a search list. The search list is used to previously obtain and manage attribute information assigned to image data. By creating a search list in advance, it becomes possible to quickly perform reproduction or removal processing for each attribute. The search list creation processing is executed in the background, similarly to the processing of calculating the total number of image data. It is, therefore, possible to execute the next processing without standing by for completion of the search list creation processing.

In step S511, the system control unit 201 enters an input standby state.

<Shooting Parameter Setting>

A setting method which prioritizes the image quality of the in-camera by the shooting parameter setting operation in step S406 of FIG. 4 will be described with reference to FIG. 6.

Figure 8A:
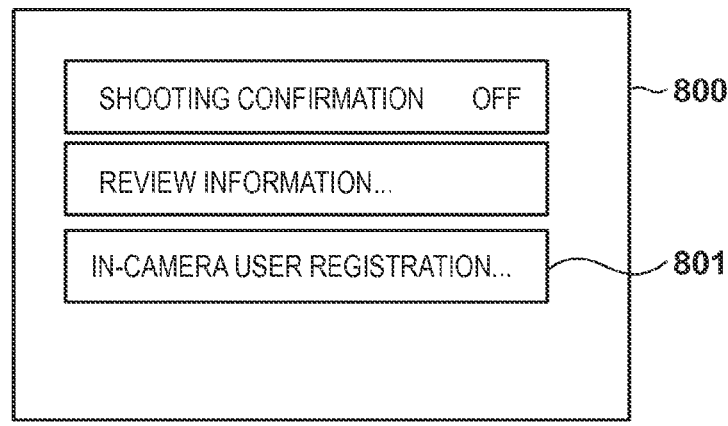
FIGS. 8A to 8C are views each exemplifying a UI screen for performing the shooting parameter setting processing shown in FIG. 6.

In step S601, the system control unit 201 determines whether a user operation has been performed through a menu (FIG. 8A) using the operation units 104. If user operation registration has been performed, the process advances to step S602. FIG. 8A shows a UI screen 800 for user registration in step S601. By selecting an in-camera user registration menu 801, it becomes possible to perform user registration.

Figure 8B:
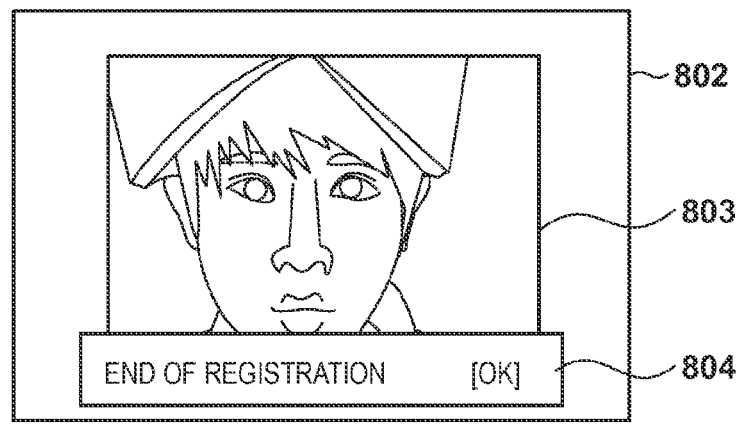

In step S602, the system control unit 201 through-displays an in-camera image, and displays a registration end dialog (FIG. 8B). FIG. 8B shows a UI screen 802 for ending user registration in step S602, on which a live view 803 of the in-camera image is displayed. When OK is selected in a registration end dialog 804, the process can end.

If it is selected to end registration in step S603, the system control unit 201 ends the shooting parameter setting operation. On the other hand, if it is not selected to end registration, the process advances to step S604.

If it is determined in step S604 that the system control unit 201 could detect a face as a result of face detection, the process advances to step S605; otherwise, the process returns to step S602 and the system control unit 201 maintains the live view display until a face is detected.

In step S605, the system control unit 201 performs user registration shooting using the in-camera.

In step S606, the system control unit 201 performs display for confirming the shot face.

Figure 8C:
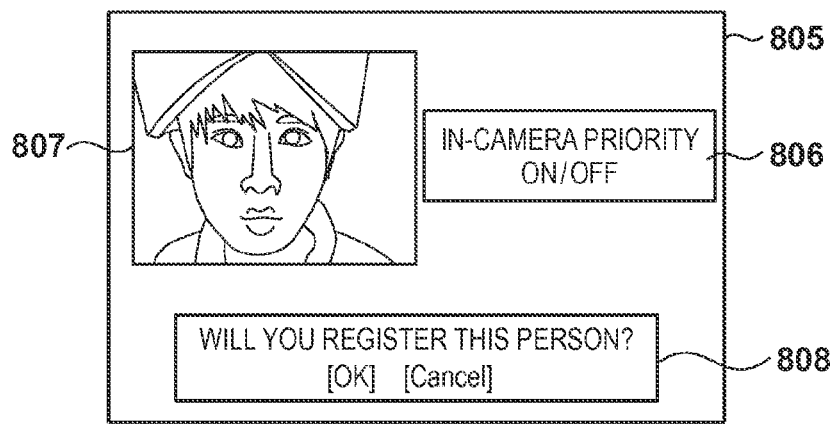

If it is selected to execute registration in step S607, the system control unit 201 stores face information in the non-volatile memory 213 (step S608). FIG. 8C shows a UI screen 805 for registering person information in step S608, on which a parameter setting dialog 806 allows setting of shooting parameters of the registered person. In FIG. 8C, setting of prioritizing the image quality of the in-camera is enabled. In a confirmation display region 807, it is possible to confirm the person to be registered. Confirmation or cancellation of registration can be selected in a user registration dialog 808. In the aforementioned shooting parameter setting operation, by making a setting to prioritize the number of recording pixels of the in-camera image data, it is possible to prioritize and record an image of the photographer. This function is effective, for example, if, when a child uses the camera, it is preferable to prioritize images including the face of the child who is a photographer over images shot by him/her, and record them.

A photographer and registered user confirmation method will now be described.

In step S609, the system control unit 201 determines whether photographer detection has been set by a shooting parameter. If photographer detection has been set, the image processing unit 207 performs face detection for the in-camera image data (step S610).

In step S611, the system control unit 201 determines whether the nonvolatile memory 213 stores a registered user. If there is no registered user, the process ends; otherwise, the process advances to step S612.

In step S612, the system control unit 201 performs in-camera priority setting. More specifically, the system control unit 201 prioritizes the number of recording pixels of in-camera image data, and sets it to be larger than that of out-camera image data.

If in-camera priority setting is performed, the number of recording pixels of in-camera image data is set to be larger than that when no in-camera priority setting is performed. If in-camera priority setting is performed, the number of recording pixels of the in-camera is set to be larger than that of the out-camera. In addition, if in-camera priority setting is performed, the number of recording pixels of the out-camera may be set to be smaller than that in the normal state in which no in-camera priority setting is performed, thereby attaining in-camera priority setting.

The above processing makes it possible to record the face of a child with high image quality, as in the above-described example.

Note that in addition to performing in-camera priority setting by changing the number of recording pixels, a method of prioritizing the image quality to perform in-camera priority setting by setting a larger aperture value for in-camera image data or prioritizing setting of a compression ratio is plausible.

In-camera priority display or out-camera priority display may be performed in through display in the shooting mode or in quick review display in addition to the reproduction mode. If in-camera priority display or out-camera priority display is performed in through display or quick review display, the display is switched between in-camera priority display and out-camera priority display according to whether a photographer detected from an image shot by the in-camera is a recorded user. If, for example, it is determined that the photographer is a registered user, processing of performing out-camera priority display to display only an image shot by the out-camera and setting an image shot by the in-camera in a non-display state may be executed.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-244807 filed Nov. 6, 2012, and Japanese Patent Application No. 2013-209623 filed Oct. 4, 2013, which are hereby incorporated by reference herein in their entirety.

What is claimed is:

1. An image capturing apparatus comprising:
   a first image capturing unit configured to shoot an object side;
   a second image capturing unit configured to shoot a photographer side;
   a processor configured to function as a control unit configured to, in a case that an object detected from image data shot by the second image capturing unit is a predetermined object, control to prioritize setting of shooting parameters of the second image capturing unit over that of the first image capturing unit.

2. The apparatus according to claim 1, wherein in the case that the object detected from the image data shot by the second image capturing unit is the predetermined object, the control unit sets a number of recording pixels of an image shot by the second image capturing unit to be larger than that in a case that the object detected from the image data shot by the second image capturing unit is not the predetermined object.

3. The apparatus according to claim 1, wherein in a case that the object detected from the image data shot by the second image capturing unit is the predetermined object, the control unit sets a number of recording pixels of the image data shot by the second image capturing unit to be larger than that of image data shot by the first image capturing unit.

4. The apparatus according to claim 1, wherein in a case that the object detected from the image data shot by the second image capturing unit is the predetermined object, the control unit sets a number of recording pixels of the image data shot by the second image capturing unit to a small value.

5. The apparatus according to claim 1, further comprising:
   a setting unit configured to set the shooting parameters; and
   a registration unit configured to perform user registration of a photographer,
   wherein the predetermined object is the photographer registered by the registration unit.

6. The apparatus according to claim 1, wherein
the object detected from the image data shot by the second image capturing unit is a face of a person, and
in a case that the face of a predetermined person is detected from the image data shot by the second image capturing unit, the control unit sets the number of recording pixels of the image data shot by the second image capturing unit to be larger than that of image data shot by the first image capturing unit.

7. The apparatus according to claim 1, wherein
the object detected from the image data shot by the second image capturing unit is a face of a person, and
in a case that the face of a predetermined person is detected from the image data shot by the second image capturing unit, the control unit sets a compression ratio of the image data shot by the second image capturing unit to be lower than that of image data shot by the first image capturing unit.

8. A method of controlling an image capturing apparatus having a first image capturing unit configured to shoot an object side and a second image capturing unit configured to shoot a photographer side, the method comprising:
detecting an object from image data shot by the second image capturing unit;
determining whether the detected object is a predetermined object; and
in a case that it is determined that the detected object is the predetermined object, controlling to prioritize setting of shooting parameters of the second image capturing unit over that of the first image capturing unit.

9. A non-transitory computer-readable storage medium storing a program for causing a computer to execute a method of controlling an image capturing apparatus having a first image capturing unit configured to shoot an object side and a second image capturing unit configured to shoot a photographer side, the method comprising:
detecting an object from image data shot by the second image capturing unit;
determining whether the detected object is a predetermined object; and
controlling to prioritize setting of shooting parameters of the second image capturing unit over that of the first image capturing unit in a case that it is determined that the detected object is the predetermined object.

* * * * *